US009489838B2

(12) United States Patent
Fowe et al.

(10) Patent No.: US 9,489,838 B2
(45) Date of Patent: Nov. 8, 2016

(54) PROBABILISTIC ROAD SYSTEM REPORTING

(71) Applicant: HERE Global B.V., Veldhoven (NL)

(72) Inventors: James Adeyemi Fowe, Evanston, IL (US); Gavril Giurgiu, Chicago, IL (US); Leon Oliver Stenneth, Chicago, IL (US); Vladimir Boroditsky, Northbrook, IL (US)

(73) Assignee: HERE Global B.V., Eindhoven (NL)

( * ) Notice: Subject to any disclaimer, the term of this patent is extended or adjusted under 35 U.S.C. 154(b) by 120 days.

(21) Appl. No.: 14/204,315

(22) Filed: Mar. 11, 2014

(65) Prior Publication Data

US 2015/0262477 A1 Sep. 17, 2015

(51) Int. Cl.

*G06F 19/00* (2011.01)
*G08G 1/01* (2006.01)
*G08G 1/0967* (2006.01)
*G06F 7/70* (2006.01)
*G06G 7/76* (2006.01)
*G08G 1/00* (2006.01)

(52) U.S. Cl.

CPC .............. *G08G 1/0133* (2013.01); *G08G 1/01* (2013.01); *G08G 1/0141* (2013.01); *G08G 1/096716* (2013.01); *G08G 1/096741* (2013.01); *G08G 1/096775* (2013.01)

(58) Field of Classification Search

CPC .............................. G08G 1/01; G08G 1/0133
USPC .................................................. 701/117–119
See application file for complete search history.

(56) References Cited

U.S. PATENT DOCUMENTS

| | | | | |
|---|---|---|---|---|
| 5,987,374 | A * | 11/1999 | Akutsu .................. | G08G 1/164 701/117 |
| 6,861,960 | B2 | 3/2005 | Hessing et al. | |
| 7,587,186 | B2 | 9/2009 | Duckeck | |
| 2008/0071465 | A1 * | 3/2008 | Chapman et al. ............ | 701/117 |
| 2012/0316765 | A1 | 12/2012 | Marko | |

FOREIGN PATENT DOCUMENTS

| | | | |
|---|---|---|---|
| EP | 1022704 | A1 | 7/2000 |
| EP | 2166524 | A1 | 3/2010 |
| EP | 2219167 | B1 | 1/2012 |
| EP | 2442291 | B1 | 4/2013 |
| WO | WO2008083743 | A1 | 7/2008 |
| WO | WO2011085421 | A2 | 7/2011 |

* cited by examiner

*Primary Examiner* — Helal A Algahaim
*Assistant Examiner* — Mahmoud Ismail
(74) *Attorney, Agent, or Firm* — Lempia Summerfield Katz LLC

(57) ABSTRACT

Probabilistic road system reporting may involve determining a probability that a section of road is congested, calculating the congestion levels for sections of road having a high probability of congestion, and providing calculated congestion levels. The high probability congestion road sections may also be subject to more frequent congestion level calculation and updating than road sections having lesser probabilities of congestion.

17 Claims, 8 Drawing Sheets

| Road Link id 810 | Relative probability of congestion at time t (%) – EPOCH 1 812 | Relative probability of congestion at time t(%) – EPOCH 2 812 | Relative probability of congestion at time t (%) – EPOCH N 816 |
|---|---|---|---|
| 24244 | 98.2 | 94.2 | 91.2 |
| 2353 | 97.3 | 72.3 | 75.6 |
| 34444 | 97.3 | 97.3 | 77.3 |
| 23435 | 97.1 | 67.1 | 57.8 |
| 122212 | 5.4 | 5.4 | 5.4 |
| 1322 | 0.23 | 0.23 | 90.23 |

FIG. 8

PROBABILISTIC ROAD SYSTEM REPORTING

FIELD

The following disclosure relates to probabilistic road system reporting, and more specifically to providing indications of traffic conditions for a road system based on probabilities of road system segment traffic congestion.

BACKGROUND

Road systems may involve collections of dozens, hundreds, or even thousands of individual roads or sections of road known as segments. A particular road system may have varying traffic densities, flows, events, or conditions in different geographic positions throughout the road system. Traffic data may be available for many of the road segments of a road system. However, the sheer volume involved with reporting traffic for a road system as a whole may require significant resources such that the provision of accurate and/or timely reporting of traffic for all road segments of a road system may not be practical, or even possible.

SUMMARY

In an embodiment, a method may involve determining probabilities of congestion of respective road segments of a road network, calculating a current congestion of a first one of the road segments determined to have a higher probability of congestion and not calculating a current congestion of a second one of the road segments determined to have a lower probability of congestion, and providing an indication of the calculated current congestion of the first one of the road segments to a user.

In an embodiment, a non-transitory computer readable medium including instructions that when executed on a computer are operable to cause the computer to obtain a probability of congestion of a particular road segment of a road network comprising a plurality of road segments using at least historical data relating to traffic on the plurality of road segments of the road network, receive recent data relating to traffic of the plurality of road segments, calculate a current congestion of the particular road segment when the obtained probability of congestion indicates that the particular road segment has a high probability of congestion, and provide an indication of the calculated current congestion of the particular road segment to a user.

In an embodiment, an apparatus may involve at least one processor, and at least one memory including computer program code. The at least one memory and the computer program code may be configured to, with the at least one processor, cause the apparatus to at least determine probabilities of congestion of road segments of a road network using at least historical device data relating to traffic on the road segments of the road network, the probability of traffic congestion determined for a specific time, identify, for the specific time, a sub-set of the road segments having higher probabilities of congestion than others of the road segments, calculate current traffic congestion of the road segments of the sub-set based on recent device data, and provide, in real-time, an indication of the calculated current traffic congestion of the road segments of the sub-set determined to have the higher probability of traffic congestion.

BRIEF DESCRIPTION OF THE DRAWINGS

Exemplary embodiments of the present invention are described herein with reference to the following drawings.

FIG. 8 illustrates example probabilities of congestion for road segments for various time periods.

DETAILED DESCRIPTION

Figure 1:
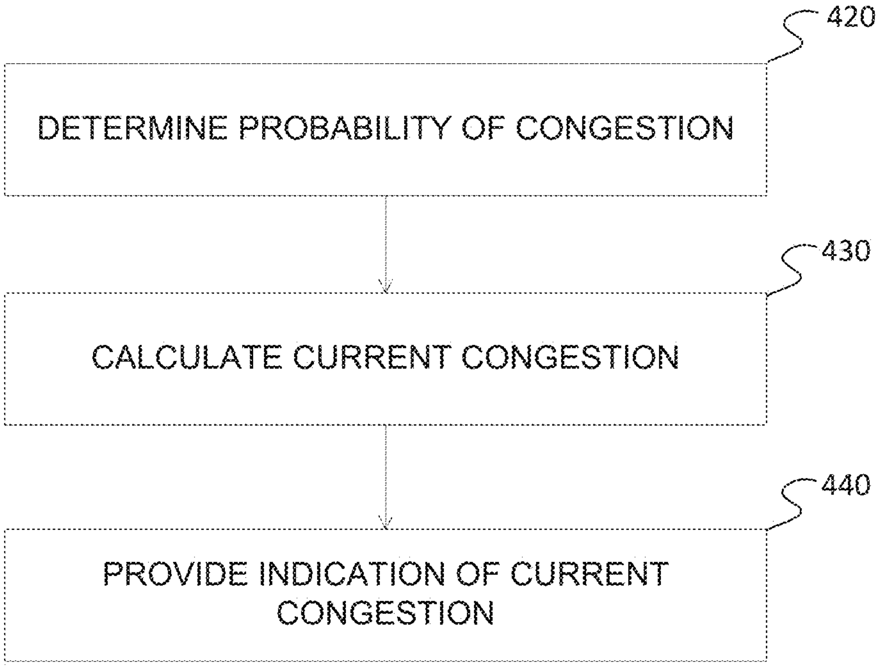
FIG. 1 illustrates an example embodiment for probabilistic road system reporting.

Historical and/or recent data relating to traffic for roads and road segments may be analyzed to determine a probability that traffic congestion exists in a road segment. These probabilities may be used to determine which road segments are selected for updating, or calculating, traffic conditions with current traffic data. Thus, road segments having a higher probability of traffic congestion receive higher priority for updating than road segments having a lower probability of traffic congestion. In this way, resources are used to determine specific current traffic conditions for the road segments that are most likely to be congested, and consequently, the road segments of most interest to travelers or users of a system.

Historical and recent data relating to traffic for roads may be determined using devices associated with a road system. These devices may be static and measure traffic characteristics as vehicles pass the device, or the devices may be mobile devices associated with vehicles or travelers of the road system. For example, many travelers of road systems use the navigation capability of mobile units or devices to aid in the traversal of the road systems. This phenomenon provides a significant amount of mobile device data associated with the road system. As travelers typically obey road system limitations, such as road direction and traffic flow restrictions, the data may be indicative of traffic on road of a road system.

Mobile device data may be collected over a period of time. The collected mobile device data may originate from a mobile device located geographically proximate to a road segment of a road system so as to be associable with the road segment. This data collection may provide a significant amount of mobile device movement information as it relates to traffic for the road. Mobile device data, as well as static device data, collected over a recent period of time may be analyzed to indicate the recent or real-time traffic conditions for the road.

Different indications of traffic levels for various road segments may be provided to a user of a mobile device, such as a device described below with respect to FIG. 5. The user may be provided a visible representation of the traffic levels. Different graphics may be used for different traffic levels. For example, the segments or lengths of road having different traffic levels are presented in different colors, instead of a singular color for the entire length of road. A user may then use this traffic information to plan a route through a road system, or modify a current route through a road system. Updating the road segments most likely to be congested more often presents an accurate view of the probable traffic state for a traveler at any given time. As such, providing specific and accurate information relating to traffic conditions of road segments having a high probability of congestion may both serve the information needs of the traveler navigating a road system, as well as achieve an efficient use of system resources in providing the traffic information.

Figure 7:
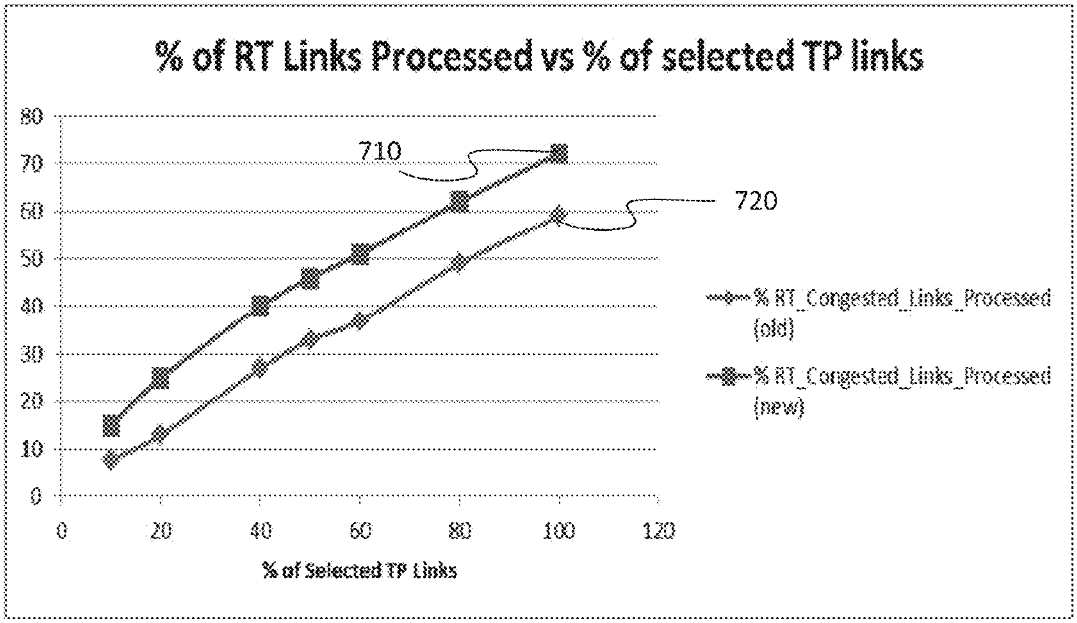
FIG. 7 illustrates the computational efficiency of an existing road network reporting system as compared with a road network reporting system implemented using an embodiment of probabilistic road system reporting.

An indication of an increase of processing efficiency available for a system implementing an embodiment of probabilistic traffic reporting 710 as compared to an existing traffic reporting system 720 may be seen with respect to FIG. 7. Specifically, FIG. 7 shows that the probability embodiment system may be able to predict and calculate congestion levels for 13% more road segments than the existing method. This additional processing capability may allow for a more accurate, updated, and useful representation of traffic in a road system. Greater or lesser benefits in resource realization may be provided, depending on settings such as the threshold for probabilities used to select congestion to calculate.

FIG. 1 illustrates an example embodiment of a method for probabilistic road system reporting. As presented in the following sections, the steps may be performed using any combination of the components indicated in FIG. 4, FIG. 5, or FIG. 6. For example, the term controller may refer to either controller 200 or processor 300 and the following acts may be performed by mobile device 122, server 125, or a combination thereof. Additional, different, or fewer acts may be provided. The acts are performed in the order shown or other orders. The acts may also be repeated.

In act 420, a probability of congestion of road segments of a road network is determined. The road network may be any road network. The road network, or system, may be for a geographic region involving a collection of road segments representing the road network, as discussed with respect to FIG. 2.

The probability of congestion for road segments may be determined using any technique. Also, the probability of congestion may be determined for a singular road segment or for multiple, or all, segments of a road network.

In an embodiment, a probability of congestion may be determined using historical data relating to traffic for the road network. Historical data may relate to measurements of vehicle speeds as related to road segments of the road network. For example, devices may be used over time to record the velocities or speeds of vehicles located on road segments. Further, times of acquisition may be included in the device data. Therefore, device data may be segmented or grouped temporally to provide data for various times of day, days of the week, or times of year.

The historical data may be any type of data, such as mobile device data, static device data, or any combination of these. In an embodiment, mobile device data is collected for periods of time from a plurality of mobile devices associated with a length of road having a plurality of road segments. Mobile device data may be associated with vehicles, or roads. Associating mobile device data with a road may involve position data that indicates the mobile device is within a certain distance of the road. The periods of time may each be a number of minutes, hours, days, or any period of time sufficient to provide enough mobile device data to be analyzed. In an embodiment, the period of time is a recent period of time selected to indicate present or real-time data relating to the length of road. For example, the period of time may be the last five minutes. The period of time may be an extended period of time, involving several days or months where data is collected.

The mobile device data may be any mobile device data indicative of traffic conditions or flow levels. For example, the mobile device data may include location data, velocity data, direction of travel data, time data, or any other data originating from a mobile device such as the mobile device described below with respect to FIG. 5.

The mobile device data may be associated, or presumed to be associated, with vehicles traveling a road system on the length of road. In an embodiment, a road may involve multi-directional or opposing traffic flows. As such, each direction of traffic flow for a physical road structure may be considered an independent length of road as referenced herein. In an embodiment, mobile device data associated with vehicles is distinguished from mobile device data associated with pedestrians. This distinction may be performed based on a type of mobile device that the data originated from, the type of data that is received, or an identifier included in the mobile device data that indicates the association of the data.

Static device data may involve a device configured to measure velocities of vehicles as they pass the device. For example, the static device may be a computer device as described below with respect to FIGS. 4-6 that also includes an input device, such as Doppler radar enabled hardware, capable of measuring the velocity of a vehicle or multiple vehicles over time. Associating this device with a specific geographic location may also associate the data acquired with this device with a road corresponding to the geographic location. In other embodiments, the static device data is acquired from a road monitor or traffic flow monitor installed within or adjacent to a road, such as a road probe for counting traffic volume.

In an embodiment, static device data and mobile device data may be combined to provide a number of readings related to traffic conditions or flows for a road. For example, the mobile device data and the static device data may provide velocity values for a number of vehicles over a period of time. These velocity values may be used together to indicate traffic conditions and/or determine a probability of congestion for a road segment.

Traffic data may be collected for all or multiple roads of a road network. Traffic data may also be collected as it relates to multiple specific road segments or sections of the road network. Any segmentation may define a road segment. For example, defined lengths of road may be indexed as a reporting location of a Traffic Message Channel (TMC) addressing scheme. TMC is a technology for delivering traffic and travel information to motor vehicle drivers. It is digitally coded, using the Radio Data System on conventional FM radio broadcasts. It can also be transmitted on Digital Audio Broadcasting or satellite radio. TMC allows silent delivery of dynamic information suitable for reproduction or display in a user's language without interrupting audio broadcast services. Both public and commercial services are operational in many countries. When data is integrated directly into a navigation system, traffic information can be used in the system's route calculation and road system display to inform a user of the traffic conditions or congestion levels of designated segments or lengths of road.

Another example of road network segmentation may be provided by a Dynamic Location Reference (DLR) protocol provided by the Transport Protocol Experts Group (TPEG). Unlike TMC which indexes specific sections of a road network and refers to the indexed section for reporting, DLR references data based on coordinates (i.e. latitude and longitude values). For example, latitude and longitude coordinates along with shape points are used to define road segments. Thus, determining contiguous road segments, as well as traffic data relating to contiguous road segments, may require more resources than the same activities using TMC. DLR, however, may be used in situations where there are road segments, but no TMC index for one or more of the road segments. Thus, these "Off-TMC" road segments may still have traffic data associated.

The traffic data for multiple road segments may be requested or otherwise provided and received by a system to determine traffic characteristics for the road network. A probability that one or more road segments is congested may be determined using the traffic data. In an embodiment, the probability of congestion for a particular road segment is determined using Equation 1.

$$P = \frac{S_{historical}}{S_{free\ flow}} \qquad \text{Equation 1}$$

In Equation 1, P is the probability of congestion of the particular road segment. $S_{historical}$ is a historical speed of the particular road segment determined using the historical data. The historical speed may be the value of an average velocity for vehicles on the particular road segment. The historical speed may be limited in time. For example, past speeds for a given time of day and/or day of the week is used (e.g., 8:00-8:05 am on Mondays where the current request for congestion information is for 8:03 am on a Monday). Month or year based time selection may be used, such as to account for holidays. Alternatively, the historical speed is an average over multiple time segments (e.g., daily average speed). $S_{free\ flow}$ is an expected speed of vehicles on the particular road segment in free flow traffic conditions, for example when there are very low traffic levels on the road segment. $S_{free\ flow}$ may be a speed limit or a measured speed.

In an embodiment, current or recent device data may be used to determine a probability of congestion for road segments. The current data is used, and the historical data outside a current time period is not used. Current device data may be used alone or in conjunction with historical device data to determine probabilities of congestion for road segments. Current device data may be collected using static and mobile devices as indicated above with respect to historical device data.

Current data may be considered current when the data relates to a recent period of time. In an embodiment, the current data may involve data relating to values provided over a period of time, such as 15 minutes, up to the current existing time when a request for traffic conditions is received. In another embodiment, current device data may involve data relating to values for a recent period, not including a present time. For example, current device data may involve data based on a time delay such as 15 minutes. The recent time period may be considered indicative of current traffic conditions, but the delay may allow for more efficient system resource usage. Current device data may be received by a system, and used for subsequent or concurrent processing of traffic data.

Current device data may provide an indication of the current probability of congestion for a road segment, based on current data. For example, a fundamental equation for determining traffic flow is given by Equation 2.

$$Q = K(V) \qquad \text{Equation 2:}$$

In Equation 2, Q is the traffic flow, K is the volume of traffic, and V is the velocity of the traffic. Building on Equation 2, a probability that a particular link will be congested is proportional to the volume of traffic, and inversely proportional to the velocity or speed of traffic. This general relationship provides for Equation 3.

$$P_{(t)} \propto \frac{K_{(t)}}{V_{(t)}} \qquad \text{Equation 3}$$

In Equation 3, P is the probability of congestion at a given time t, K is the volume of traffic at the given time t, and V is the velocity, or speed, of the traffic at the given time t.

Another indicator of traffic congestion is a jam factor. For example, a jam factor may be calculated using Equation 4.

$$F = \frac{S_{current}}{S_{free\ flow}} \qquad \text{Equation 4}$$

In Equation 4, F is the jam factor, $S_{current}$ is an average speed for a segment determined using current device data, and $S_{free\ flow}$ is an expected speed of vehicles in free flow traffic conditions for the segment, for example when there are very low traffic levels on the segment. Given these relationships, the probability of congestion is inversely proportional to the jam factor, providing Equation 5.

$$P \propto \frac{1}{F} \qquad \text{Equation 5}$$

In Equation 5, P is the probability of congestion and F is the jam factor. Combining Equation 3 and Equation 5 will provide the relationship indicated by Equation 6.

$$P = \beta\frac{S_{free\ flow}(K)}{S_{current}} \qquad \text{Equation 6}$$

In Equation 6, P is the probability of congestion. $S_{current}$ is a current speed of a road segment. $S_{free\ flow}$ is an expected speed on the particular road segment in free flow traffic conditions, for example when there are very low traffic levels on the road segment. β is proportionality constant for calculating particular values of the probability of congestion. In an embodiment, the current speed of a road segment may be a speed correlated to data for a recent time period. The recent time period may be based on a delay, such as 15 minutes, such that the data is considered indicative of current conditions.

It also may be realized that a relative traffic volume of a road or road segment in a traffic processing system may be indicated by a value, such as probe path counts. Probe path counts may be a number of individual readings for velocities of vehicles, static sensors, or travelers on a road or road segment. This value may not be a precise indicator of traffic levels, but a valid assumption may be made that path counts are indicative of traffic volume such that the more path counts the higher the probability that traffic volume is high. Using this relationship, Equation 7 may be provided.

$$P = \alpha \frac{S_{free\ flow}(N_{paths})}{S_{current}} \quad \text{Equation 7}$$

In Equation 6, P is the probability of congestion. $S_{current}$ is a current speed. $S_{free\ flow}$ is an expected speed on the particular road segment in free flow traffic conditions, for example when there are very low traffic levels on the road segment. $N_{paths}$ is the number of path counts, and a is a proportionality constant for calculating particular values of the probability of congestion using $N_{paths}$.

Realizing that a relative comparison is used to distinguish particular roads and road segments having high probabilities of congestion, the proportionality constant value α becomes unnecessary. As such, in an embodiment, the probability of congestion for a particular road segment i is determined using Equation 8:

$$P_i = \frac{S_{i\text{-}free\ flow}(N_{i\text{-}paths})}{S_{i\text{-}current}} \quad \text{Equation 8}$$

In Equation 8, $P_i$ is the probability of congestion of the particular road segment, i. $S_{i\text{-}current}$ is a current average speed of the particular road segment, i, determined using current device data. $S_{i\text{-}free\ flow}$ is an expected speed of vehicles on the particular road segment in free flow traffic conditions, and $N_{i\text{-}paths}$ is the number of path counts for the particular road segment.

Road segments of a road network may be grouped based on determined probabilities of congestion. In an embodiment, road segments with similar probabilities of congestion may be grouped and the groups may define probability of congestion characteristics for the road segments. Limits or threshold values may be used to establish categories such as low probability, moderate probability, and high probability. For example, road segments found to have a probability of congestion at 90% or higher may be considered road segments with a high probability of congestion, whereas road segments found to have a probability of congestion of 40% or lower may be considered to have a low probability of congestion. In another embodiment, clustering techniques such as the K-means or hierarchical clustering techniques, may be used to determine probability levels to associate with road segments.

Traffic or device data may be grouped or organized temporally such that determining the probability of congestion comprises determining a probability of congestion for a particular time or a period of time. The time may be a time of day, day of a week, time of year, or any other temporal grouping. In an embodiment, probabilities of congestion may be determined for road segments of a road network at various increments throughout a day. For example, a table may be provided that includes the calculated probabilities of congestion for road segments of a road network at the different periods of the day. The table may include all road segments, or a subset of the road segments. The subset of the road segments may be the road segments determined to have a high probability of congestion for that particular time as indicated in the table. For example, the 30 road segments of a road network having the highest probability of congestion at various times throughout the day may be included and listed in a table. Different road segments may be listed in the table for different periods of time. For example, 30 different road segments may be listed for a 7:00 AM time than a 5:00 PM time.

In an embodiment, road segments may be grouped by probability of congestion both temporally and by value. For example, a table may be created that lists the high probability road segments.

In an embodiment, road segments determined to have a high probability of congestion may be provided a higher priority for processing of traffic data related to those road segments, whereas low probability of congestion road segments may have a lower priority.

In an embodiment, a geographic area defining a road network may define the road segments for which a probability of congestion determination is made. For example, a specific user may establish a route to travel through a geographic area. The route may involve a collection of road segments. A probability of congestion determination may be limited to the road segments of the route.

In act 430, a current congestion of road segments determined to have a high probability of congestion may be calculated. Road segments may be determined to have a high probability of congestion through any technique. For example, a threshold value for a probability of congestion may be established, and road segments having a probability of congestion meeting or exceeding the threshold may be determined to have a high probability. Road segments determined to have a lower probability of congestion may have an associated traffic congestion calculated less often, or even not at all. For example, road segments having a lower probability of congestion may be assumed to have free flow traffic, and thus little to no congestion. In alternative embodiments, the inverse may be used, such as using a threshold based on the probability of not having congestion.

The current congestion may be calculated using any technique. In an embodiment, the current congestion may be calculated using current device data. In an embodiment, the traffic congestion may be calculated as a jam factor, as is indicated with respect to Equation 4, using current device data. In an embodiment current device data may be received or otherwise available for only road segments identified as having a high probability of congestion. Road segments not having associated current data may have current congestion assumed to be at free flow levels. Road segments not having associated current data may also use a previous congestion value or a congestion value determined using historical traffic data as a current congestion level.

In an embodiment, road segments may be provided a priority proportional to the determined probability of congestion, and road segments having a higher priority will have the traffic congestion calculated, whereas road segments having a lower priority will not have traffic congestion calculated. Further, the priority may be proportional to an amount of system resources allocated to calculating particular road segment traffic congestion. The number of road segments for which updated or current road congestion is to be provided is based on resources, and that number of road segments are selected from the priority list.

In an embodiment, a certain number of road segments having the highest probability of congestion have a traffic congestion calculated, whereas other road segments do not have the traffic congestion calculated. For example, if three road segments have probabilities of congestion calculated at 94.2%, 67.1%, and 5.4%, the road segment having a 94.2% probability may have a current traffic congestion calculated, whereas the road segments having 67.1% and 5.4% probabilities may not have current traffic congestions calculated.

In an embodiment, determining the probability of congestion involves determining a probability of congestion for a particular time of day, and calculating the current congestion of road segments involves calculating the congestion of road segments at a time of day correlating to the particular time of day. For example, a probability of congestion may be determined for a road segment for a time period proximate to 7:00 AM on Mondays. This probability of congestion used for evaluating whether a road segment has a high probability of congestion at 7:00 AM on Monday such that congestion on the road segment may be calculated.

In an embodiment, the probability of congestion for road segments are determined for specific periods of time throughout a day, and the current congestion is calculated of the road segments during a specific period of time when the road segments are determined to have a high probability of congestion. For example, a road segment may have a high probability of traffic congestion at 7:00 AM, but a low probability of traffic congestion at 2:00 PM. The traffic congestion for this road segment may be calculated at 7:00 AM, but not at 2:00 PM based on application of a same threshold.

In an embodiment, the road segments are provided a priority proportional to the determined probability of congestion, and road segments provided a higher priority are calculated on a shorter period than road segments having a lower priority. In an embodiment, the calculating of the current congestion of road segments may be repeated periodically. In this way, current data may continually be received and provided. Further, the time period for repeating may be shorter for road segments determined to have a higher probability of congestion than the time period for repeating for road segments determined to have a lower probability. For example, road segments having a high probability may have congestion calculated every minute, whereas road segments having a lower probability may have congestion calculated every 30 minutes. Periods for calculation may vary for road segments as related to a map or route request for a user as well. Road segments associated with a map or route request for a user, or a group of users, may have a shorter period for updating current congestion levels for high congestion probability road segments than high probability road segments not associated with a map or route request.

Probabilities of congestion 812 for various road segments 810 at different epochs or times may be seen with respect to FIG. 8, as well as probabilities of congestion with respect to general historical data not related to a specific time period 816. With reference to FIG. 8, Road link 23435 may be considered to have a high probability of congestion at Epoch 1, and a low probability of congestion at Epoch 2. As such, Road link 23435 may have a current congestion level calculated for a time period correlating to Epoch 1, but not calculated for a time period correlated to Epoch 2.

In act 440, an indication of the calculated current congestion of the road segments determined to have the high probability of congestion may be provided. The calculated current congestion may be provided by any technique. For example, the current congestion may be provided to a user of a system or mobile device.

Traffic congestion may be indicated by any technique. For example, colors and/or patterns are used to indicate congestion levels. In an embodiment, traffic congestion is indicated using a plateaued threshold reporting scheme. For example, a series of traffic flow thresholds may be established such that a traffic congestion value for a segment falls into a category defined by traffic congestion threshold category boundaries. Each traffic congestion threshold category may be indicated differently. For example, a segment having a high traffic congestion category may be presented to a user differently than a segment having a low traffic congestion category. Any indication that differentiates the different traffic flow levels may be used. In an embodiment, colors may be used for characterizations of traffic flow, and indicating the different traffic flow level comprises using different colors for a first segment and a second segment. Varying patterns or other indications may also be used to indicate different traffic levels for segments. In an embodiment, a jam factor may be used to determine values for traffic level categories. For example, a heavy traffic category may have a jam factor value between 0 and 0.030. A moderately heavy traffic category may have a jam factor value between 0.030 and 0.330. A moderate traffic category may have a jam factor between 0.330 and 0.727, and a light or free flow traffic category may have a jam factor between 0.727 and 1.0. Any number of levels or categories may be provided.

In an embodiment, road segments determined not to have a high probability of congestion may have indications of congestion provided as well. These indications may be based on a basic level of congestion determined from historical traffic data relating to the road segment. Alternatively, the congestion level may be assumed to be at free flow traffic levels. In an embodiment, road segments not having current traffic congestion calculated may have an associated congestion level provided as a free flow traffic level. In another embodiment, road segments not having current traffic congestion calculated may be provided with an indication of the last value determined for congestion of the road segment. As such, road segments determined not to have a high probability of congestion may not have an actual or current congestion calculated and provided at all. A color, coding or other indicator may be provided to show the user that replacement or historical data is used for that road segment.

Figure 2:
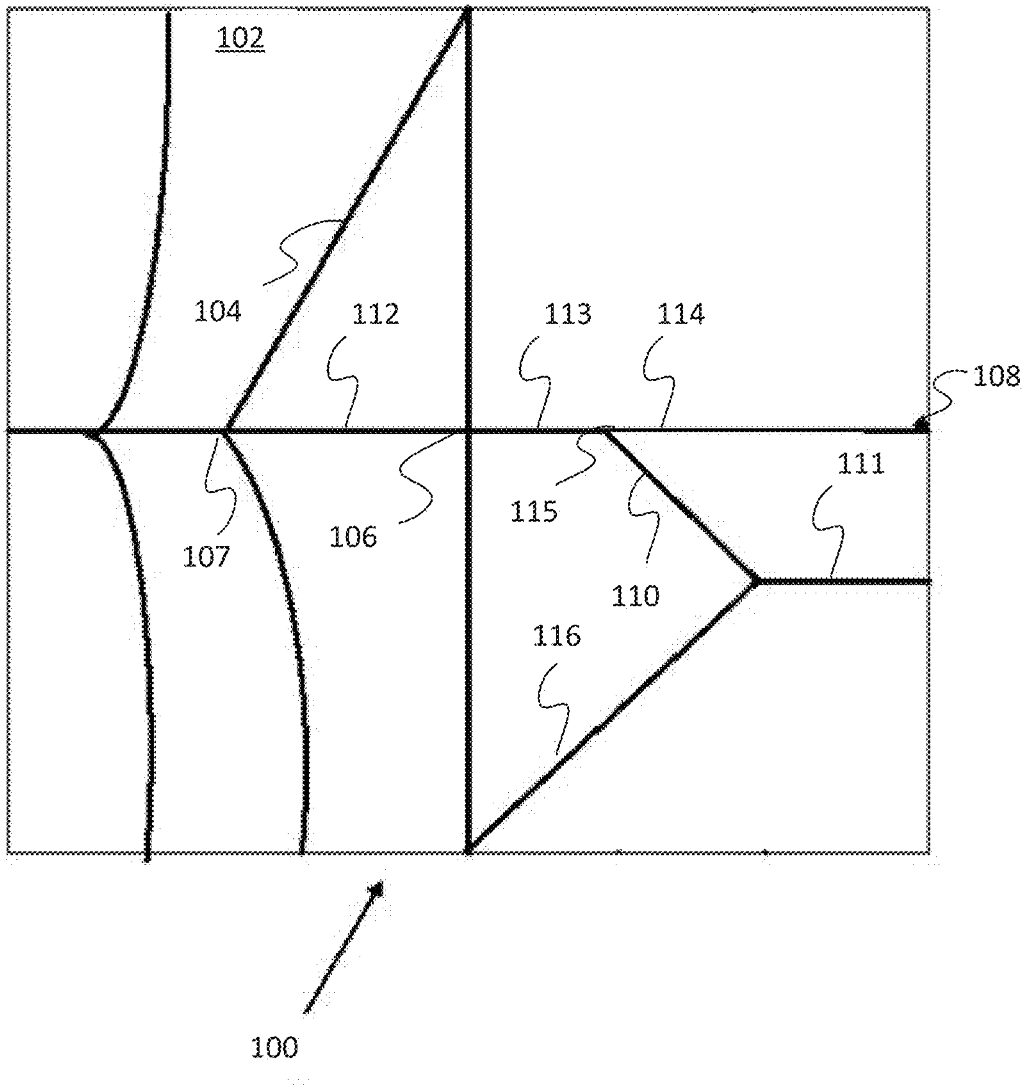
FIG. 2 is an example road system of a geographic region.

In an embodiment, the road network is a road network for a geographic region 100, as illustrated by FIG. 2. The region 100 may be a country (e.g., France), state (e.g., Illinois), province, city (e.g., Chicago), metropolitan area (e.g., the New York metropolitan area), county (e.g., Cook County, Ill.), any other municipal entity, or any other area of comparable or different size. Alternatively, the geographic region 100 may be a combination of one or more countries, states, cities, metropolitan areas, and so on. The region 100 may also represent locations without reference to geo-political boundaries, such as being a rectangular regions centered on or relative to a particular point or location. The region 100 includes a road network 102. The road network 102 may include, among other things, a plurality of road segments 104, 112, 113, 114, 110, 111, 116 connected at intersections 106, 115 throughout the region 100. The intersections 106, 115 may also be considered nodes. Though not depicted herein, the region 100 may also include one or more points of interest, such as businesses, municipal entities, tourist attractions, and/or other points of interest, one or more topographical features (e.g., ponds, lakes, mountains, hills, etc.) of the geographic region 100, pedestrian network having sidewalks and pedestrian paths, a bicycle network having bike paths, bike lanes on road segments, and/or road segments appropriate for bicycle travel, and/or a public transit network including, for example, railroads, public bus lines, tourist bus lines, metro railway lines (e.g., subways and elevated lines), light rail (e.g., trams, trolleys, or street cars), water taxi, and stations and/or stops for one or more of each. The region 100 may include other networks, features, and/or points as well. In an embodiment, road segments between a first node 107 and a second node 108 of the road system may involve multiple road segments 112, 113, 114. A probability of congestion may be determined for each of the road segments 104, 112, 113, 114, 110, 111, 116 of the road network.

Figure 3:
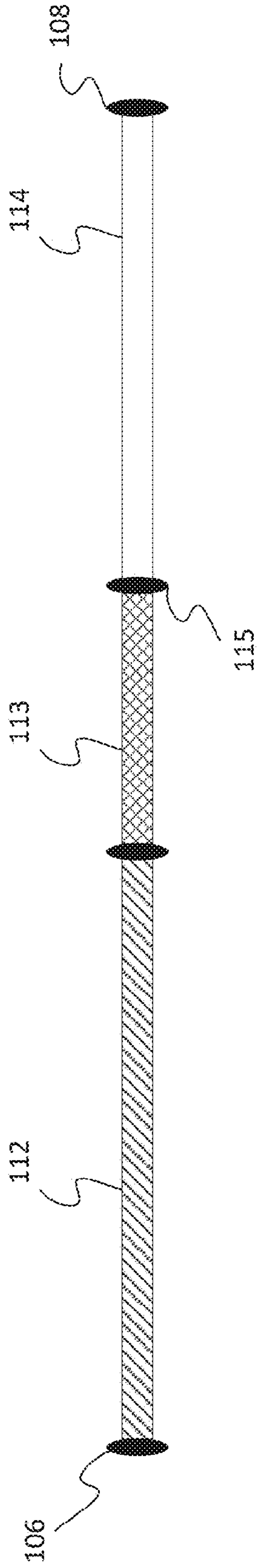
FIG. 3 illustrates an exemplary length of road for probabilistic road network reporting.

FIG. 3 illustrates segments of a road 112, 113, 114 between two nodes 106, 108 of the road network 102 of FIG. 2. The probability of congestion of the segments 112, 113, 114 may be determined. Two segments 112, 113 may be determined to have a high probability of congestion using historical and/or current traffic data. The influx in traffic may be caused by an influx of traffic due to road segment 110 which intersects with one of the segments 113 at a node 115, as can be seen in FIG. 2.

Recent device data relating to the high probability of congestion road segments 112, 113 may be received, and current congestion values may be calculated for those segments 112, 113. The other segment 114 is determined to have a low probability of congestion, so no congestion values are calculated.

The road segments 112, 113, 114 may be provided to a user such that the traffic congestion for the segments 112, 113, 114 is indicated. For example, the diagonal line pattern for a segment 112 may indicate calculated moderate levels of traffic and a hatched pattern for a segment 113 may indicate calculated heavy levels of traffic. A segment 114 having a low probability of congestion may be shown with no pattern displayed. This may indicate that traffic at free flow levels is assumed.

Figure 4:
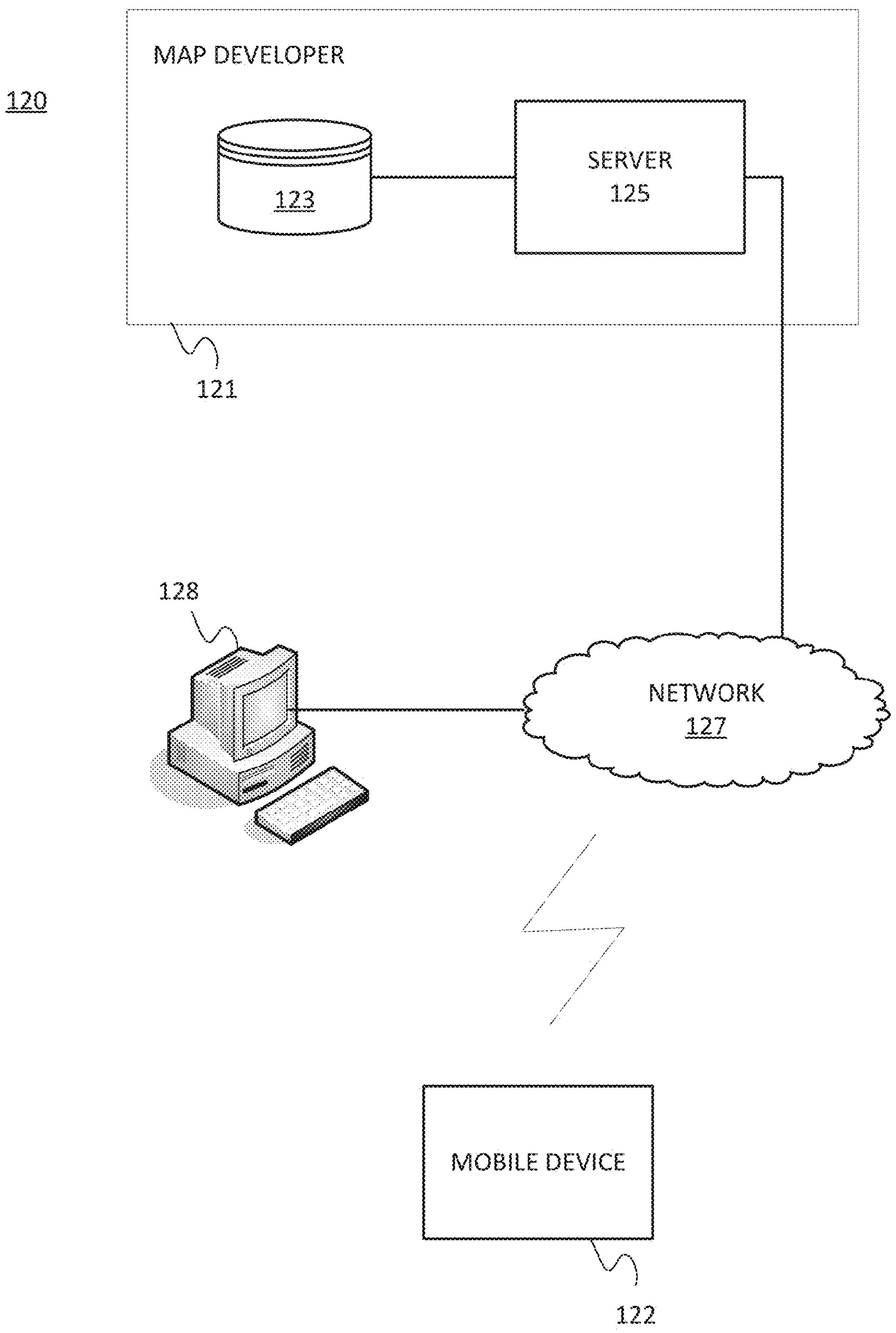
FIG. 4 illustrates an exemplary geographic or navigation system.

FIG. 4 illustrates an exemplary geographic or navigation system 120. The geographic or navigation system 120 includes a map developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator such as NAVTEQ or Nokia Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The mobile device 122 may include one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation, velocity, or acceleration. Movement information may also be determined using the positioning system.

The mobile device 122 may communicate location and movement information via the network 127 to the server 125. The server 125 may use the location and movement information received from the mobile device 122 to associate the mobile device 122 with a geographic region, or a road of a geographic region, described in the geographic database 123. Server 125 may also associate the mobile device 122 with a geographic region, or a road of a geographic region, manually.

The server 125 may receive location and movement information from multiple mobile devices 122 over the network 127. The location and movement information may be in the form of mobile device data. The server 124 may compare the mobile device data with data of a road system stored in the database 123. The server 125 may determine a probability of congestion for road segments, then calculate and provide an indication of traffic congestion for road segments found to have a high probability of congestion.

The computing resources for probabilistic road system reporting may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5:
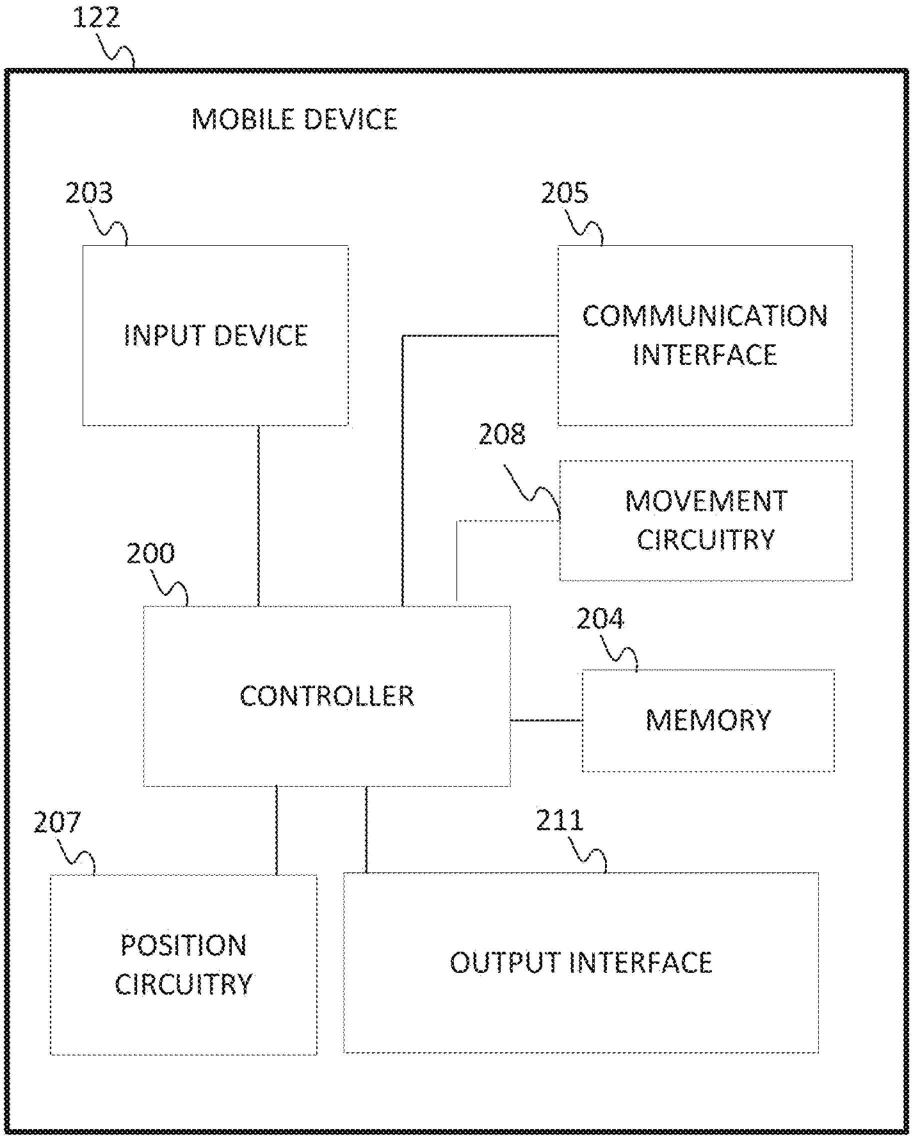
FIG. 5 illustrates an exemplary mobile device of the geographic or navigation system of FIG. 4.

FIG. 5 illustrates an exemplary mobile device of the geographic or navigation system of FIG. 4. The mobile device 122 may be referred to as a navigation device. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a mobile device, or the mobile device may be integrated into a vehicle. The positioning circuitry 207, which is an example of a positioning system, is configured to determine a geographic position of the mobile device 122. The movement circuitry 208, which is an example a movement tracking system, is configured to determine movement of a mobile device 122. The position circuitry 207 and the movement circuitry 208 may be separate systems, or segments of the same positioning or movement circuitry system. In an embodiment, components as described herein with respect to the mobile device 122 may be implemented as a static device. For example, such a device may not include movement circuitry 208, but may involve a traffic or speed detecting input device 203 such as a Doppler radar velocity detector or a contact sensing traffic volume measurement apparatus.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

Positioning and movement data obtained from a mobile device may be considered geographic data, device data, and/or mobile device data.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The communication interface 205 is configured to send mobile device movement and position data to a server 125. The movement and position data sent to the server 125 may be used to determine traffic flows for a road and segments of the road. The communication interface 205 may also be configured to receive data indicative of an indication of traffic congestion for road segments. The position circuitry 207 is configured to determine the current location of the mobile device. The controller 200 may be configured to determine a calculate traffic congestion and probabilities of traffic congestion for road segments. The controller 200 may also be configured to determine a visual indication to a display that represents different traffic congestion levels. The output interface 211 may be configured to present a visual indication of the traffic congestions to a user of the mobile device 122. The output interface 211 may also be configured to present directions incorporating the traffic congestions for road segments.

Figure 6:
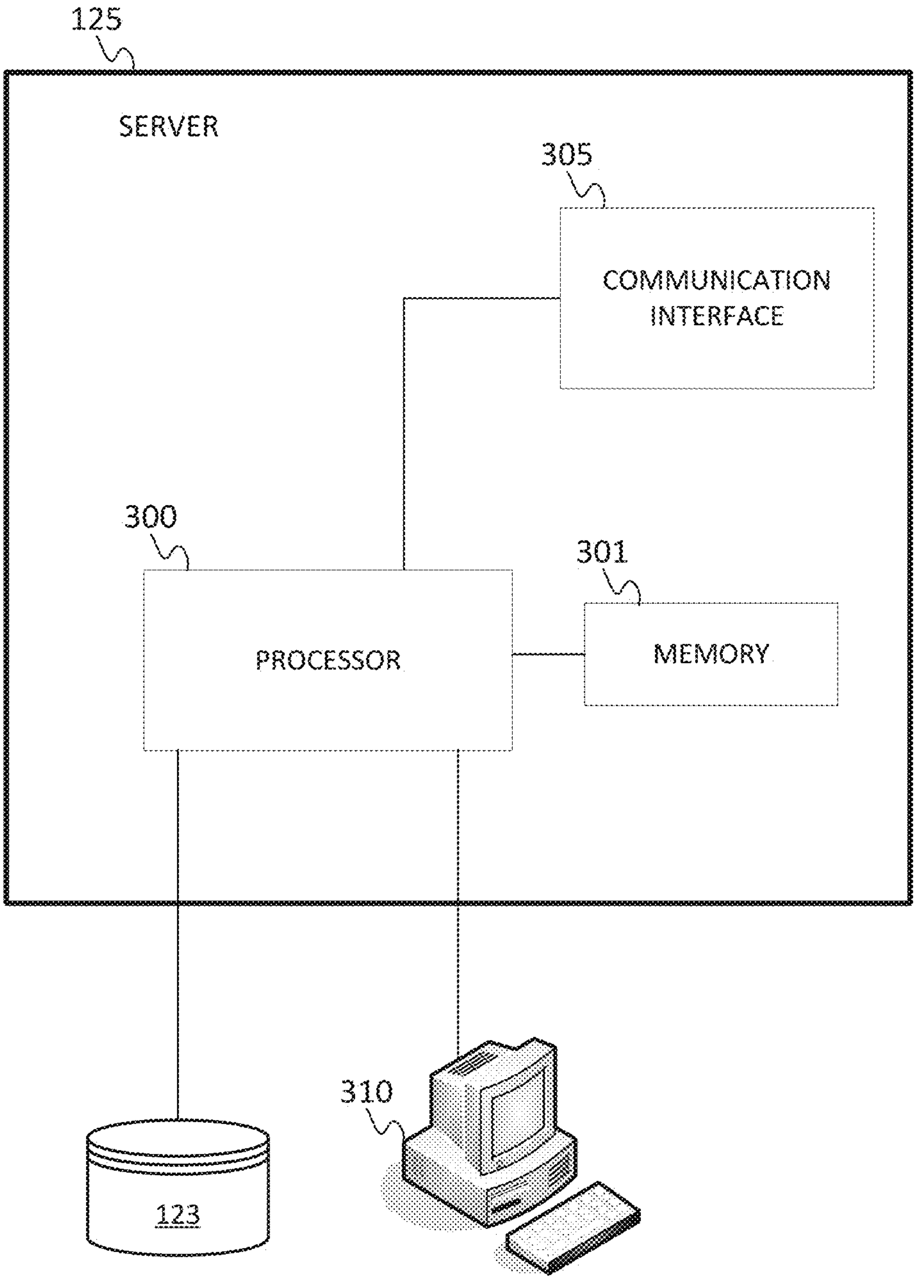
FIG. 6 illustrates an exemplary server of the geographic or navigation system of FIG. 4.

FIG. 6 illustrates an exemplary server of the geographic or navigation system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 may receive data indicative of use inputs made via the mobile device 122.

The communication interface 305 is configured to receive mobile device data representing locations and movements of a plurality of mobile devices 122. The processor 300 may be configured to calculate traffic congestion for segments of road. In an embodiment, the processor 300 is configured to calculate probabilities of congestion and congestion values for road segments. As such, the processor 300 is configured to determine a probability of congestion of road segments of a road network the road network involving a plurality of road segments using at least historical device data relating to traffic on the road segments of the road network, the probability of traffic congestion determined for a specific time, receive recent device data relating to traffic of road segments determined to have a high probability of congestion, the recent device data relating to the specific time, calculate a current traffic congestion of the road segments determined to have a high probability of congestion based on the recent device data, and provide, in real-time, an indication of the calculated current traffic congestion of the road segments determined to have the high probability of traffic congestion.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an embodiment, the set of instructions may be configured to cause the server 125 to determine a probability of congestion of road segments of a road network comprising a plurality of road segments using at least historical data relating to traffic on the road segments of the road network. The instructions may also be configured to cause the server 125 to receive recent data relating to traffic of road segments determined to have a high probability of congestion, and calculate a current congestion of the road segments determined to have a high probability of congestion. The instructions may also be configured to cause the server 125 to provide an indication of the calculated current congestion of the road segments determined to have the high probability of congestion to a user.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data.

Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:

determining, by at least one processor, probabilities of congestion of respective road segments of a road network using the following equation:

$$P = \frac{S_{historical}}{S_{free\ flow}},$$

wherein P is the probability of congestion of a road segment, $S_{historical}$ is a historical speed of the road segment determined using historical data relating to traffic for the road network and $S_{free\ flow}$ is an expected seed of vehicles on the road segment in free flow traffic conditions;

receiving at least a portion of current data relating to traffic for the road network derived from a Global Positioning System (GPS) in one or more mobile devices;

calculating, using the current data, a current congestion of a first one of the road segments determined to have a higher probability of congestion and not calculating a current congestion of a second one of the road segments determined to have a lower probability of congestion, wherein the lower probability of congestion or the higher probability of congestion are determined based on an expected speed of vehicles on the particular road segment in free flow traffic conditions;

generating data indicative of a visual representation including an indication of the calculated current congestion of the first one of the road segments; and sending the data indicative of a visual representation including the indication of the calculated current congestion to a navigation device.

2. The method of claim 1, wherein the determining the probabilities of congestion comprises determining the probabilities of congestion for a particular time of day, and calculating the current congestion of road segments involves calculating the congestion of road segments at a time of day correlating to the particular time of day.

3. The method of claim 1, further comprising: repeating the calculating of the current congestions of the first one of the road segments.

4. A non-transitory computer readable medium including instructions that when executed on a computer are operable to cause the computer to:

receive, from one or more mobile devices, at least a portion of recent data derived from a Global Positioning System (GPS) and relating to traffic of a plurality of road segments;

obtain a probability of congestion of a particular road segment of a road network comprising the plurality of road segments from the following equation:

$$P = \frac{S_{free\ flow}(N_{paths})}{S_{current}}$$

wherein P is the probability of congestion of the particular road segment, $S_{current}$ is a current average speed of the particular road segment determined using the recent data, $N_{paths}$ is a number of path counts determined for the particular road segment, and $S_{free\ flow}$ is an expected seed of vehicles on the particular road segment in free flow traffic conditions;

calculate a current congestion of the particular road segment in response to the obtained probability of congestion indicating that the particular road segment has a high probability of congestion;

generate data indicative of a visual representation including an indication of the calculated current congestion of the particular road segment; and send the data indicative of a visual representation including the indication of the calculated current congestion to a navigation device.

5. The non-transitory computer readable medium of claim 4, wherein the probability of congestion is obtained for specific periods of time throughout a day, and the current congestion of the particular road segment is calculated during a specific period of time when the particular road segment is indicated as a high probability of congestion.

6. The non-transitory computer readable medium of claim 4, wherein the current congestion of the particular road segment is calculated using the recent data.

7. The non-transitory computer readable medium of claim 4, wherein the instructions are further operable to: repeat the calculating of the current congestion of the particular road segment periodically.

8. The non-transitory computer readable medium of claim 7, wherein the instructions are further operable to:

determine probabilities of congestion for other road segments of the plurality of road segments; and calculate the current congestions of the other road segments.

9. The non-transitory computer readable medium of claim 8, wherein a time period for repeating is shorter for road segments determined to have a higher probability than the time period for repeating for road segments determined to have a lower probability.

10. The non-transitory computer readable medium of claim 8, wherein the road segments are provided a priority proportional to the determined probability of congestion, and road segments provided a higher priority are calculated on a shorter period than road segments having a lower priority.

11. The non-transitory computer readable medium of claim 4, wherein the instructions are further operable to: obtain probabilities of congestion of other road segments of the plurality of road segments; and provide an indication of congestion for road segments where the obtained probabilities of congestion indicate that road segments do not to have the high probability of congestion, the indication based on historical data relating to traffic congestion of the road segments.

12. An apparatus comprising:

at least one processor; and at least one memory including computer program code; the at least one memory and the computer program code configured to, with the at least one processor, cause the apparatus to at least:

determine probabilities of congestion of road segments of a road network using at least historical device data relating to traffic on the road segments of the road network;

identify, for a specific time, a sub-set of the road segments having higher probabilities of congestion than others of the road segments;

calculate current traffic congestion of the road segments of the sub-set based on recent device data; and provide, in real-time, an indication of the calculated current traffic congestion of the road segments of the sub-set determined to have the higher probability of traffic congestion, wherein the probabilities of congestion are determined using historical data relating to traffic for the road network, wherein the probabilities of congestion are determined using the following equation:

$$P = \frac{S_{historical}}{S_{free\ flow}},$$

wherein P is the probability of congestion of a road segment, $S_{historical}$ is a historical speed of the road segment determined using the historical data, and $S_{free\ flow}$ is an expected speed of vehicles on the road segment in free flow traffic conditions.

13. The apparatus of claim 12, wherein the indication is provided using a plateaued threshold reporting scheme involving the use of colors or patterns for indications of congestion.

14. The apparatus of claim 12, wherein the computer program code is further configured to cause the apparatus to provide an indication of congestion for road segments determined not to have the high probability of congestion, the indication based on historical data relating to traffic congestion of the road segments.

15. An apparatus comprising:

at least one processor; and at least one memory including computer program code; the at least one memory and the computer program code configured to, with the at least one processor, cause the apparatus to at least:

determine probabilities of congestion of road segments of a road network using at least historical device data relating to traffic on the road segments of the road network;

identify, for a specific time, a sub-set of the road segments having higher probabilities of congestion than others of the road segments;

receive current data relating to traffic for the road network;

calculate current traffic congestion of the road segments of the sub-set based on recent device data and the current data relating to traffic for the road network; and provide, in real-time, an indication of the calculated current traffic congestion of the road segments of the sub-set determined to have the higher probability of traffic congestion, wherein the probabilities of congestion are determined using the following equation:

$$P = \frac{S_{free\ flow}(N_{paths})}{S_{current}},$$

wherein P is the probability of congestion of a particular road segment, $S_{current}$ is a current average speed of the particular road segment determined using the current device data, $N_{paths}$ is the number of path counts determined for the particular road segment, and $S_{free\ flow}$ is the expected speed of vehicles on the particular road segment in free flow traffic conditions.

16. The method of claim 1, wherein at least a portion of the current data relating to traffic for the road network is received from one or more static sensor devices.

17. The non-transitory computer readable medium of claim 4, wherein at least a portion of the current data relating to traffic for the road network is received from one or more static sensor devices.

* * * * *